Patented Sept. 12, 1933

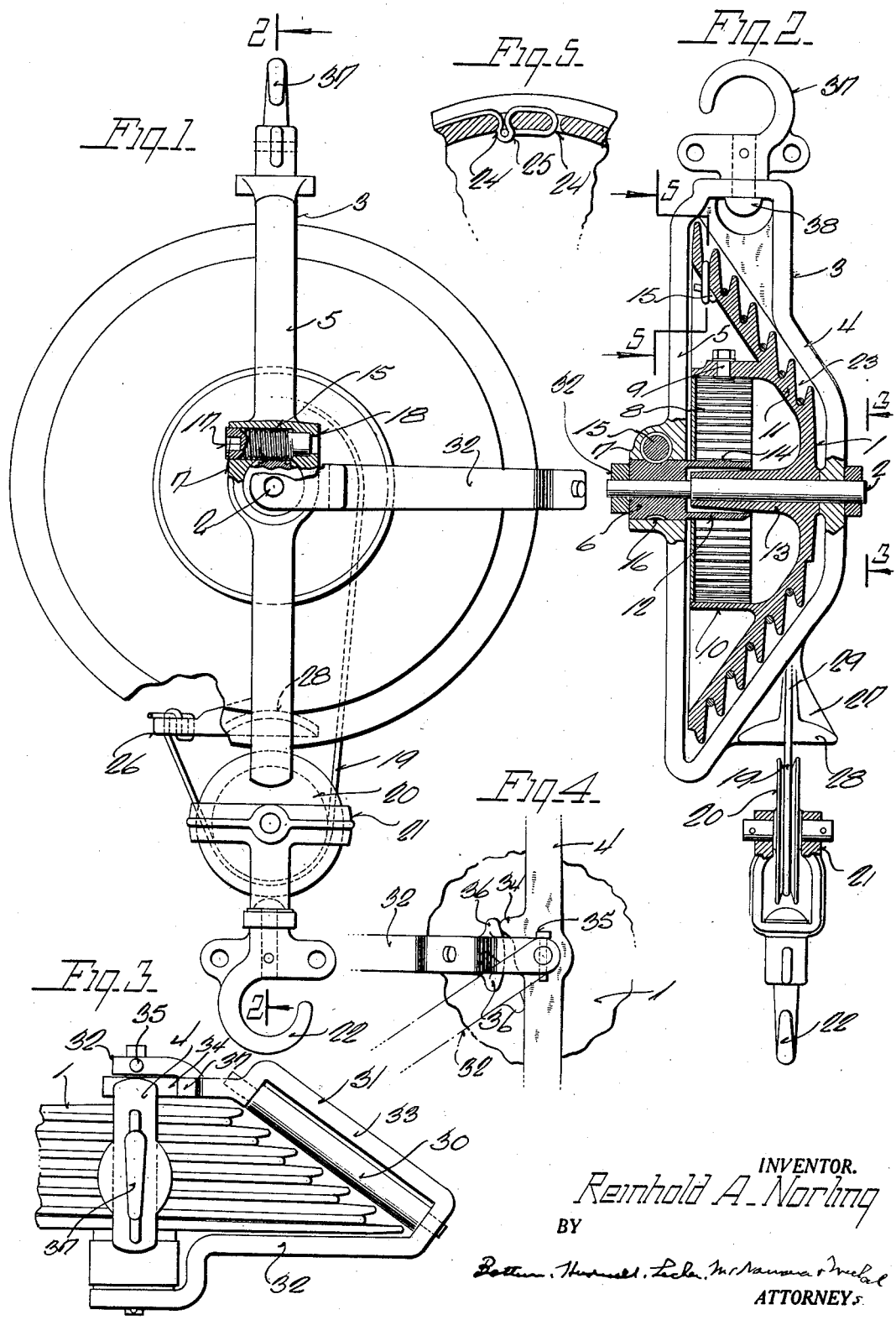

1,926,452

UNITED STATES PATENT OFFICE 1,926,452

BALANCER

Reinhold A. Norling, Aurora, Ill., assignor to Independent Pneumatic Tool Co., Chicago, Ill., a corporation of Delaware Application March 16, 1931, Serial No. 523,165

5 Claims. (Cl. 242—107)

This invention relates to counter-balances, particularly adapted for suspending portable power driven tools, such as electric drills and the like from an overhead support above the places of work, so that the tools may be elevated out of the way when not in use, but may be readily drawn down to the work when desired.

In my co-pending application, Serial No. 523,164, filed March 16, 1931, I have described and claimed a counter-balance in which the cable carrying portion of the spring controlled reel or drum is tapered or inclined to the axis of the reel so as to have substantially the same tension on the spring in all positions of the load on the cable at different distances from the reel. The taper or incline of the reel is relatively slight, and thus the range or extent of up and down movement of the load is limited to the difference between the large and small diameters of the reel as provided by the taper thereof.

In accordance with my present invention, I provide the reel or drum with an extreme taper or incline in order to rapidly increase the diameter of the reel from its smaller to its larger end and thus provide a greater range or extent of movement for the load or tool suspended from the cable with a balanced condition for the tool at any position of its up or down movement.

A further object of my invention is to provide the taper portion of the reel with a straight flange to provide a support for the spring.

A further object of my invention is to provide an open or skeleton-like supporting frame for the reel, whereby a large size reel as provided by the extreme taper may readily be accommodated without undue increase of the expense of the balancer.

Another object of my invention is to provide a novel form of cable guard and mounting therefor as required for a large size reel.

Other and further objects of my invention will appear from the following specification taken in connection with the accompanying drawing, in which—

Fig. 1 is a side view, with parts broken away and in section, of a counter-balancer constructed in accordance with my invention;

Fig. 2 is a vertical sectional view taken on line 2—2 of Fig. 1, with parts in elevation;

Fig. 3 is a top plan view of a part of the device to show the cable guard;

Fig. 4 is a side view illustrating a detail of structure employed with the guard; and Fig. 5 is a vertical sectional view taken on line 5—5 of Fig. 2.

In the drawing, 1 indicates the reel or drum of the balancer, 2 the shaft on which the reel is revolubly mounted, and 3 the support for the shaft. The support 3 is in the form of an open frame comprising a pair of laterally narrow members 4, 5 on opposite sides of the reel and connected at their ends, above and below the reel, as shown. The frame may be in the form of a one-piece casting and being open on opposite sides permits the reel to be inserted into the frame through either side in assembling the device.

The shaft 2 extends across the frame between the side members 4, 5 thereof, and has one end secured by a driving fit in the side member 4 so as to hold the shaft against rotation. The other end of the shaft is reduced and extends through a sheave 6 journaled in the other side member 5 of the frame in an enlarged boss 7 cast thereon and projecting laterally outward from the frame, as shown.

The reel 1 is made hollow and is located in the frame with its open side adjacent the side member 5 to receive a flat coil spring 8, the outer end of which is secured by a bolt or other fastening member 9 to the inner surface of an annular flange 10 located within the reel and preferably formed integral therewith. The spring is located within the flange and the latter is made substantially parallel to the axis of the reel, as provided by the shaft 2, to provide a flat support for the spring made necessary by reason of the extreme taper or incline given to the cable carrying portion 11 of the reel.

The sleeve 6 extends into the reel at the center of the spring and is counter bored, as at 12, to receive the hub portion 13 of the reel which hub portion provides a bearing for the reel along substantially the entire portion of the shaft 2 between the side members of the frame. This is essential because of the narrowness of the reel by reason of the extreme taper given thereto. The spring 8 surrounds the sleeve 6 and has its inner end connected to the sleeve by a key 14. By this arrangement, the tension of the spring may be adjusted by turning the sleeve 6.

The sleeve is turned by a worm 15 rotatably mounted in the boss 7 above the sleeve and having a toothed connection therewith by means of worm teeth 16 on the sleeve and screw threads on the worm. The worm 15 is accessible from the exterior of the frame and has a tool engaging socket 17 whereby the worm may be turned to adjust the tension of the spring. The teeth on the sleeve and worm are so arranged that the tendency of the spring to unwind turns the worm toward and against a shoulder 18 at the inner end of the recess in which the worm is located. This provides a stop to hold the worm from accidental turning to release the tension of the spring. The adjusting mechanism shown and described is the same as in my co-pending application and is claimed therein.

The cable 19 has one end connected to the reel and the other end connected to the frame 3 to provide a loop in the cable below and outside of the reel. A pulley or sheave 20 is engaged in this loop so that a tool or other load may be suspended from the cable in the use of the balancer. The sheave is journaled in a suitable block or frame 21 from which depends a hook 22 by means of which a tool or load may be suspended from the cable. By reason of the taper given to the cable carrying portion 11 of the reel, the latter is larger in diameter at one end than at the other. The cable 19 is attached to the largest end of the reel in the manner shown in Fig. 5. To lead the cable on the reel and cause the cable to follow the taper or incline thereof, the reel has a spiral groove 23 in the outer surface of the reel portion 11 and extending from one end of the reel to the other. The cable 19 is attached to the reel in the bottom of this groove, and to accomplish this, the reel is provided with two holes 24, 24, extending therethrough at the bottom of the groove and through which holes the cable is passed to provide a loop 25 in the cable beneath the reel at one of the holes, as shown in Fig. 5. The free end of the cable is passed through this loop and enlarges or distends the same so that it cannot be drawn through the hole. This provides a secure connection of the cable with the reel, as the tighter the cable is drawn, the tighter will be the connection.

To attach the cable to the frame 3, the latter has an outwardly extending lug 26 adjacent its lower end, as shown in Fig. 1. Said lug has three holes through which the cable is inserted to provide a loop for the free end of the cable as shown in Fig. 1. This method of attachment is disclosed and claimed in my co-pending application.

The taper or incline given to the reel 1 is considerably greater than that given to the reel in my co-pending application. In the present device, the taper is approximately at an angle of 36 degrees to the axis of the reel. With this extreme taper, the diameter of the reel increases rapidly from one end of the taper to the other, and thus the tool or load suspended from the cable may be moved a greater distance up and down that with the slightly tapered reel in my co-pending application. This follows by reason of the fact that one end of the reel is considerably larger than the other, and the travel of the cable is correspondingly greater. In addition, the tapered feature of the reel varies the leverage exerted on the spring as the reel is turned and notwithstanding the extreme taper, the load on the cable will be balanced at any distance it may be stopped from the reel, whether completely raised or completely lowered. The advantage of the extreme taper is that the tool or load suspended by the balancer may be raised to an extreme high elevation and thus be out of the way for moving objects under it as may be required in some installations.

To prevent the sheave 20 from striking the frame of the balancer in case the sheave is raised too far, I provide an abutment or stop on the lower side of the frame. In the drawing, this stop is in the form of a lug 27 cast on the frame at the side member 4 and has a concave under surface or recess 28 to receive the upper side of the sheave, as shown in Fig. 2. To strengthen the lug, it is provided with webs 29.

To prevent the cable 19 from leaving the groove 23 and thus cause the cable to follow the incline of the reel to secure the advantages thereof, I provide a guard, in the form of a roller 30 journaled in a carrying frame 31 which by side members 32, 32, straddles the reel and is journaled on the ends of the shaft 2 which is made long enough to project beyond the outer sides of the main frame 1, as shown in Figs. 2 and 3. By this arrangement, the roller with its frame may be swung into and out of the positions shown in full and dotted lines, respectively, in Fig. 4. When in raised position, as shown by the full lines, the roller extends across the reel on its outer side and being close to the reel prevents the cable from displacement out of the groove 23 in the turning of the reel. The roller is set to follow the incline of the reel by being mounted in a correspondingly disposed portion 33 of the roller carrying frame, which portion is so disposed by having the one side member 32 shorter than the other to accord with the large and small ends of the reel.

The side member 4 of the main frame is provided with a lug 34 which forms an abutment to limit the upward swinging movement of the roller carrying frame when raised. This stops the roller at its operative position. Any suitable means may be provided to hold the roller in its raised position. I have shown a pin 35 inserted through holes in the short side member 32 and the shaft 2 for this purpose. The short member 32 may have lugs 36, 36, one to contact with the stop 34 when raised, and the other to contact with the side member 4 of the main frame to support the roller frame in proper position when assemblying the balancer.

A suspension hook 37 is connected with the upper end of the main frame 3 whereby the balancer may be connected or attached to an overhead support. The hook is fixed to a vertical axis member 38 which has a swiveled connection with the main frame. The latter has its upper end shaped to accommodate the head of the axis member, and being open on opposite sides by reason of the open nature of the main frame, permits the axis member to be inserted into the frame from either side when assemblying the device.

The balancer is simple in construction and operation and is particularly designed for use with portable power driven tools, such as electric drills and the like for suspending them from an overhead support, either stationary or movable as the conditions may require. With the tool suspended by the balancer, the tool may be readily drawn down to the work and when released will be automatically raised by the spring 8 turning the reel 1 to wind the cable 19 thereon. This will carry the tool up to a position out of the way and yet be within reach of the operator for drawing the tool down to the work whenever desired. With the extreme taper of the reel, the tool may have a relatively long range of up and down movement and may thus be raised to an extreme high or lowered to an extreme down position, with the tool balanced in any of its elevated positions by the spring tension being sufficient to maintain the tool in its various positions of adjustment.

The details of construction and arrangement of parts shown and described may be variously changed and modified without departing from the spirit or scope of my invention, except as pointed out in the appended claims.

I claim as my invention:

1. A counter-balance of the character described, comprising an open frame having oppositely disposed relatively narrow side members, a shaft extending between and carried by said members, a reel on the shaft between said members and having a tapered or inclined portion adapted to have a cable wound thereon, a coil spring for turning the reel in a direction to wind the cable thereon, and means for adjusting the tension of the spring, the side member of the frame on the side of the reel having the tapered portion being inclined to follow and fit closely adjacent thereto.

2. A counter-balance of the character described, comprising a reel adapted to have a cable wound thereon, a support for the reel, said reel having a cable carrying portion at an extreme taper to the axis of the reel, a flange within the reel in concentric relation to the axis thereof and carried by the tapered portion thereof, a coil spring within said flange and connected at one end to the flange and at the other end to the support, and means for adjusting the tension of the spring.

3. A counter-balance of the character described, comprising a frame, a shaft therein, a reel in the frame and having a hub portion rotatably mounted on said shaft, a sleeve journaled in the frame and extending into the reel, said sleeve being counter-bored to receive the hub, a coil spring surrounding the sleeve and having one end connected to the reel and the other end connected to the sleeve, and means for turning the sleeve to adjust the tension of the spring.

4. A counter-balance of the character described, comprising an open frame having oppositely disposed side members, a shaft extending between and carried by said members, a reel rotatably mounted on said shaft and having a tapered or inclined cable carrying portion, a coil spring for turning the reel in a direction to wind a cable thereon, means for adjusting the tension of the spring, the side member of the frame on the side of the reel having the tapered portion being inclined to follow and fit closely adjacent thereto and a lug on one of the inclined parts of the side member below the axis of the reel to provide an abutment or stop for the load carried by the cable.

5. A counter-balance of the character described, comprising a frame having oppositely disposed side members, a shaft extending between and carried by said members, a reel rotatably mounted on the shaft and adapted to have a cable mounted thereon, a coil spring for turning the reel in a direction to wind the cable thereon, a guard in the form of a roller extending across the reel to prevent the cable from displacement thereon, and a roller carrying frame straddling the reel and journaled on the ends of the shaft extending beyond the main frame.

REINHOLD A. NORLING.